United States Patent
Foo et al.

(10) Patent No.: US 8,406,959 B2
(45) Date of Patent: Mar. 26, 2013

(54) METHOD AND APPARATUS FOR CONTROLLING AN ACTUATABLE RESTRAINT DEVICE USING A SIDE PRESSURE SENSOR

(75) Inventors: Chek-Peng Foo, Ann Arbor, MI (US); Huahn-Fern Yeh, Novi, MI (US); Suthep Thanapathomsinchai, Nakorn Pathom (TH); Rosalin Irwan, Farmington, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 345 days.

(21) Appl. No.: 12/390,081

(22) Filed: Feb. 20, 2009

(65) Prior Publication Data
US 2010/0213693 A1    Aug. 26, 2010

(51) Int. Cl.
*B60R 21/01*    (2006.01)
(52) U.S. Cl. .................. 701/45; 280/735; 340/436
(58) Field of Classification Search .......... 701/45, 701/47; 280/735; 73/862.59; 340/436, 441, 340/459
See application file for complete search history.

(56) References Cited

U.S. PATENT DOCUMENTS

| | | | |
|---|---|---|---|
| 5,748,075 A | 5/1998 | Dirmeyer et al. | |
| 5,935,182 A | 8/1999 | Foo et al. | |
| 6,036,225 A | 3/2000 | Foo et al. | |
| 6,095,554 A * | 8/2000 | Foo et al. | 280/735 |
| 6,186,539 B1 | 2/2001 | Foo et al. | |
| 6,338,028 B1 | 1/2002 | Shelton et al. | |
| 6,520,536 B2 * | 2/2003 | Foo et al. | 280/735 |
| 6,529,810 B2 | 3/2003 | Foo et al. | |
| 7,236,902 B2 * | 6/2007 | Otterbach et al. | 702/98 |
| 7,281,599 B2 * | 10/2007 | Takeuchi et al. | 180/274 |
| 7,422,086 B2 | 9/2008 | Bujak | |
| 7,484,756 B2 * | 2/2009 | Le et al. | 280/735 |
| 2005/0006886 A1 | 1/2005 | Foo et al. | |
| 2005/0155805 A1 | 7/2005 | Takeuchi et al. | |

(Continued)

OTHER PUBLICATIONS

International Search Report dated Oct. 4, 2010 for PCT International Application No. PCT/US2010/024275, filed Feb. 16, 2010.

(Continued)

*Primary Examiner* — Joseph Rocca
*Assistant Examiner* — Timothy Wilhelm
(74) *Attorney, Agent, or Firm* — Tarolli, Sundheim, Covell & Tummino LLP

(57) ABSTRACT

An apparatus for controlling an actuatable occupant restraint device of a vehicle comprises a central crash accelerometer that senses crash acceleration at a vehicle location and that provides a first crash acceleration signal indicative thereof. A side pressure sensor senses pressure in a chamber disposed at a side of the vehicle and provides a side pressure signal indicative thereof. A controller actuates the actuatable occupant restraint device in response to the first crash acceleration signal and the side pressure signal. The controller determines a first moving average of acceleration value comprising a moving average of acceleration in a direction generally perpendicular to a longitudinal axis of the vehicle determined from the first crash acceleration signal. The controller determines a change in pressure value comprising a change in pressure in the chamber determined from the side pressure signal. The controller actuates the actuatable occupant restraint device when both the first moving average of acceleration value exceeds a first threshold and the change in pressure value exceeds a second threshold.

12 Claims, 6 Drawing Sheets

U.S. PATENT DOCUMENTS

| | | |
|---|---|---|
| 2005/0209756 A1* | 9/2005 | Ueno .............................. 701/45 |
| 2006/0011862 A1 | 1/2006 | Otterbach et al. |
| 2006/0021815 A1* | 2/2006 | Ohtaka ......................... 180/274 |
| 2006/0244245 A1 | 11/2006 | Nonaka et al. |
| 2006/0255575 A1 | 11/2006 | Foo et al. |
| 2008/0249687 A1 | 10/2008 | Le et al. |

OTHER PUBLICATIONS

Written Opinion of the International Searching Authority for the corresponding PCT International Application No. PCT/US2010/024275, filed Feb. 16, 2010.

* cited by examiner

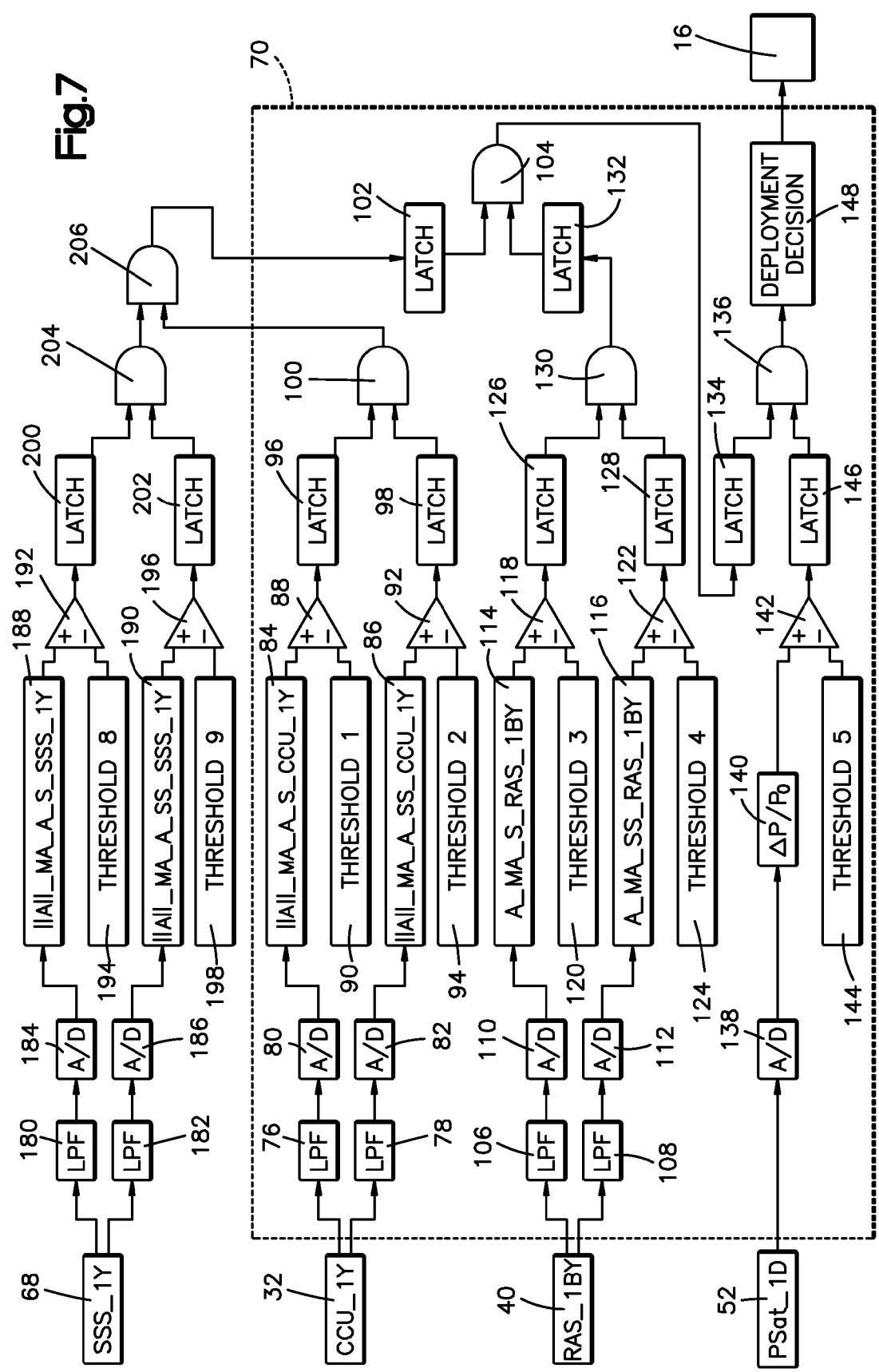

METHOD AND APPARATUS FOR CONTROLLING AN ACTUATABLE RESTRAINT DEVICE USING A SIDE PRESSURE SENSOR

FIELD OF THE INVENTION

The present invention relates to a method and apparatus for controlling a vehicle actuatable occupant restraint device and, particularly, for controlling a vehicle actuatable occupant restraint device using a side pressure sensor.

BACKGROUND OF THE INVENTION

Actuatable occupant restraint systems are used to help protect occupants of a vehicle in the event of a vehicle crash. Such an actuatable occupant restraint system may include an inflatable occupant restraint device, such as an air bag, to help protect a vehicle occupant in the event of a side impact crash. U.S. Pat. No. 5,935,182 to Foo et al., assigned to TRW Inc., discloses a method and apparatus for discriminating a vehicle crash condition using virtual sensing. U.S. Pat. No. 6,520,536 to Foo et al., also assigned to TRW Inc., discloses a method and apparatus for controlling an occupant side restraining device using vehicle side mounted accelerometers to provide an enhanced side safing function. U.S. Pat. No. 6,529,810 to Foo et al., also assigned to TRW Inc., discloses a method and apparatus for controlling an actuatable multistage restraint device using several thresholds based on transverse acceleration. U.S. Patent Application Publication No. 2006/0255575 to Foo et al., assigned to TRW Automotive U.S. LLC, discloses a method and apparatus for controlling an actuatable restraining device using XY side satellite accelerometers.

SUMMARY OF THE INVENTION

The present invention is directed to a method and apparatus for controlling a vehicle actuatable occupant restraint device using a side pressure sensor.

In a representative embodiment of the present invention, an apparatus for controlling an actuatable occupant restraint device of a vehicle comprises a crash accelerometer that senses crash acceleration at a vehicle location and that provides a first crash acceleration signal indicative thereof. A side pressure sensor senses pressure in a chamber disposed at a side of the vehicle and provides a side pressure signal indicative thereof. A controller actuates the actuatable occupant restraint device in response to the first crash acceleration signal and the side pressure signal. The controller determines a first moving average of acceleration value comprising a moving average of acceleration in a direction generally perpendicular to a longitudinal axis of the vehicle determined from the first crash acceleration signal. The controller determines a change in pressure value comprising a change in pressure in the chamber determined from the side pressure signal. The controller actuates the actuatable occupant restraint device when both the first moving average of acceleration value exceeds a first threshold and the change in pressure value exceeds a second threshold.

In accordance with another embodiment of the invention, a method is provided for controlling actuation of an actuatable occupant restraint device of a vehicle. The method comprises the step of sensing crash acceleration at a vehicle location and providing a first acceleration signal indicative thereof. The method also comprises the step of sensing pressure in a chamber disposed at a side of the vehicle and providing a side pressure signal indicative thereof. The method further comprises the step of determining a first moving average of acceleration value comprising a moving average of acceleration in a direction generally perpendicular to a longitudinal axis of the vehicle determined from the first crash acceleration signal. The method still further comprises the step of determining a change in pressure value comprising a change in pressure in the chamber determined from the side pressure signal. The method yet further comprises the step of actuating the actuatable occupant restraint device when both the first moving average of acceleration value exceeds a first threshold and the change in pressure value exceeds a second threshold.

BRIEF DESCRIPTION OF THE DRAWINGS

The foregoing and other features and advantages of the invention will become apparent to one skilled in the art upon consideration of the following description of the invention and the accompanying drawings, in which:

FIG. 7 is a logic diagram showing a third example embodiment of the control logic used by an apparatus in accordance with the present invention.

DETAILED DESCRIPTION

Figure 1:
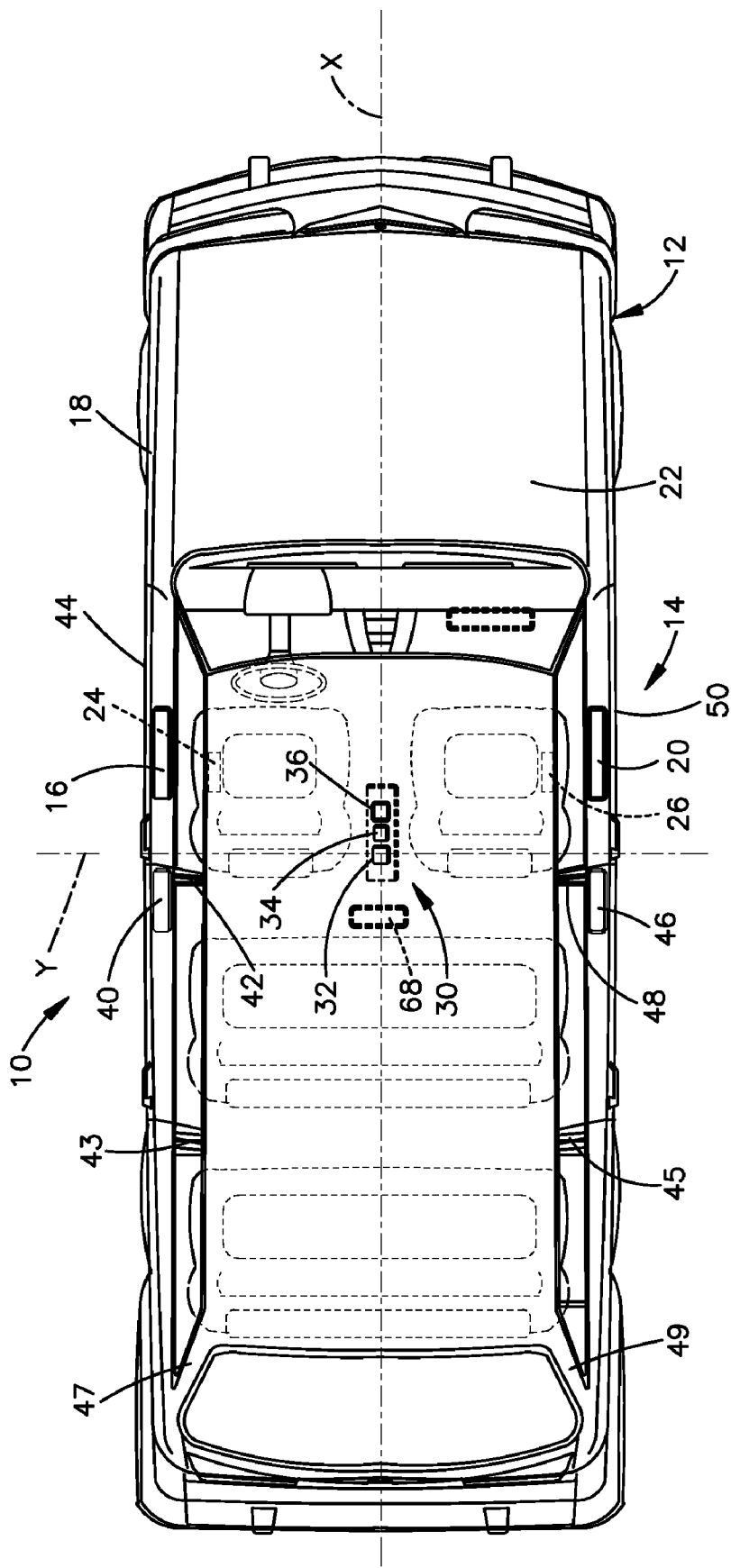
FIG. 1 is a schematic diagram of a vehicle having an actuatable occupant restraint system that is controlled by an apparatus in accordance with an example embodiment of the present invention.
Figure 3:
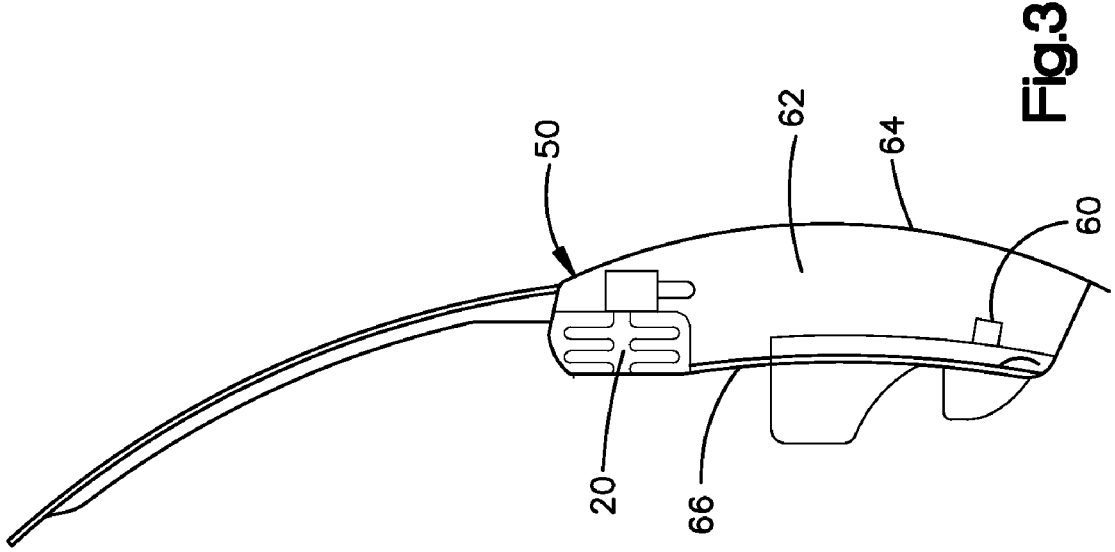
FIG. 3 is a sectional view of a passenger side vehicle door with a side pressure sensor of the apparatus of FIG. 1.
Figure 2:
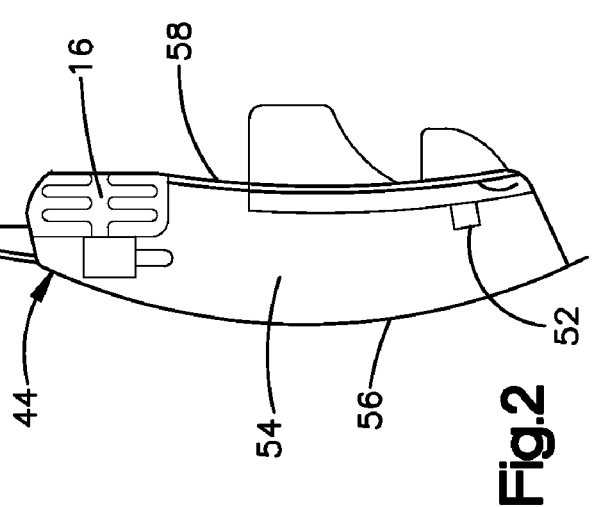
FIG. 2 is a sectional view of a driver side vehicle door with a side pressure sensor of the apparatus of FIG. 1.

As shown in FIGS. 1 through 4, an apparatus 10 is mounted in a vehicle 12 for controlling the actuation of an actuatable occupant restraint system 14, in accordance with an example of the present invention. The actuatable occupant restraint system 14 comprises a first side impact inflatable occupant restraint device 16, such as a door-mounted air bag module (shown in FIG. 2), a seat-mounted air bag module, or a roof rail-mounted curtain air bag module, located on a driver side 18 of the vehicle 12. The first side impact inflatable occupant restraint device 16 is preferably located in or adjacent to side structure of the vehicle 12, which includes vehicle doors, pillars, and side body panels. The actuatable occupant restraint system 14 also comprises a second side impact inflatable occupant restraint device 20, such as a door-mounted air bag module (shown in FIG. 3), a seat-mounted air bag module, or a roof rail-mounted curtain air bag module, located in or adjacent to side structure on a passenger side 22 of the vehicle 12. The actuatable occupant restraint system 14 may further or alternatively comprise a seat belt occupant restraint device, such as a driver side seat belt pretensioner 24 and/or a passenger side seat belt pretensioner 26. The actuatable occupant restraint system 14 may still further or alternatively comprise any actuatable occupant restraint device that helps to protect a vehicle occupant in response to a side impact to the vehicle 12.

The apparatus 10 comprises a crash or collision sensor assembly 30 located at a generally central location in the vehicle. The sensor assembly 30 includes a first crash acceleration sensor 32, which is preferably an accelerometer, having its axis of sensitivity oriented to sense crash acceleration in a direction generally parallel to a transverse or side-to-side axis of the vehicle 12. The transverse axis is designated the Y axis in FIG. 1 and is oriented perpendicular to the longitudinal or front-to-rear axis of the vehicle 12, which is designated the X axis in FIG. 1. The first crash acceleration sensor 32 provides a crash acceleration signal designated CCU_1Y. The sensor assembly 30 may also comprise a second crash acceleration sensor 34, which is preferably an accelerometer, having its axis of sensitivity oriented to sense crash acceleration in a direction generally parallel to the X axis. The second crash acceleration sensor 34 provides a crash acceleration signal designated CCU_1X. The sensor assembly 30 may further comprise a third crash acceleration sensor 36, which is preferably an accelerometer, having its axis of sensitivity oriented to sense crash acceleration in a direction generally parallel to the X axis. The third crash acceleration sensor 36 provides a crash acceleration signal designated CCU_2X.

The first crash acceleration sensor 32 preferably has a nominal sensitivity of ±20g's (g being the value of acceleration due to earth's gravity, i.e., 32 feet per second squared or 9.8 meters per second squared). The second and third crash acceleration sensors 34 and 36 preferably have nominal sensitivities of ±100g's and ±50g's, respectively.

The crash acceleration signals CCU_1Y, CCU_1X, and CCU_2X from the crash acceleration sensors 32, 34, and 36, respectively, can take any of several forms. Each of the crash acceleration signals CCU_1Y, CCU_1X, and CCU_2X can have amplitude, frequency, pulse duration, or any other electrical characteristic that varies as a function of the sensed crash acceleration. In the embodiment of FIGS. 1-4, the crash acceleration signals CCU_1Y, CCU_1X, and CCU_2X have frequency and amplitude characteristics indicative of the sensed crash acceleration. Thus, each of the crash acceleration signals CCU_1Y, CCU_1X, and CCU_2X is functionally related to the sensed crash acceleration along the axis of sensitivity of the corresponding crash acceleration sensor 32, 34 or 36, respectively.

The apparatus 10 also comprises a driver side satellite crash acceleration sensor 40, which is preferably an accelerometer, located in or adjacent to side structure on the driver side 18 of the vehicle 12, such as in the driver side vehicle B-pillar 42 or in the driver side door 44. The side satellite crash acceleration sensor 40 has an axis of sensitivity oriented to sense crash acceleration in a direction generally parallel to the vehicle's Y axis and provides a signal designated RAS_1BY. The apparatus 10 further comprises a passenger side satellite crash acceleration sensor 46, which is preferably an accelerometer, located in or adjacent to side structure on the passenger side 22 of the vehicle 12, such as in the passenger side B-pillar 48 or in the passenger side door 50. The side satellite crash acceleration sensor 46 has an axis of sensitivity oriented to sense crash acceleration in a direction generally parallel to the vehicle's Y axis and provides a signal designated as RAS_2BY.

The crash acceleration signals RAS_1BY and RAS_2BY from the side satellite crash acceleration sensors 40 and 46, respectively, can take any of several forms. Each of the crash acceleration signals RAS_1BY and RAS_2BY can have amplitude, frequency, pulse duration, or any other electrical characteristic that varies as a function of the sensed crash acceleration. In the embodiment of FIGS. 1-4, the crash acceleration signals RAS_1BY and RAS_2BY have frequency and amplitude characteristics indicative of the sensed crash acceleration in a direction generally parallel to the vehicle's Y axis. Thus, each of the crash acceleration signals RAS_1BY and RAS_2BY is functionally related to the sensed crash acceleration along the axis of sensitivity of the corresponding side satellite crash acceleration sensor 40 or 46, respectively.

Other Y axis side satellite crash acceleration sensors may be included in the apparatus 10. Such Y-axis side satellite crash acceleration sensors may be mounted in or adjacent to C-pillars 43 and 45 on the driver side 18 and passenger side 22, respectively, of the vehicle 12 and/or in or adjacent to D-pillars 47 and 49 on the driver side 18 and passenger side 22, respectively, of the vehicle. If C-pillar and/or D-pillar side satellite crash acceleration sensors are used, they provide signals designated as RAS_C3Y (driver side C-pillar 43), RAS_C4Y (passenger side C-pillar 45), RAS_D5Y (driver side D-pillar 47), and RAS_D6Y (passenger side D-pillar 49). In the embodiment of the invention shown in FIGS. 1-4, however, only side satellite crash acceleration sensors 40 and 46 are present.

A driver side pressure sensor 52 (FIG. 2), which is included in the apparatus 10, is located in the driver side door 44 of the vehicle 12. The driver side pressure sensor 52 is mounted in a chamber 54 defined between the outer metal skin 56 of the driver side door 44 and the inner panel 58 of the door. The driver side pressure sensor 52 senses the pressure in the chamber 54 and provides a signal designated PSat_1D. A similar passenger side pressure sensor 60 (FIG. 3), which is also included in the apparatus 10, is located in the passenger side door 50 of the vehicle 12. The passenger side pressure sensor 60 is mounted in a chamber 62 defined between the outer metal skin 64 of the passenger side door 50 and the inner panel 66 of the door. The passenger side pressure sensor 60 senses the pressure in the chamber 62 and provides a signal designed PSat_2D.

The driver side pressure sensor 52 and the passenger side pressure sensor 60 may be any type of pressure sensor suitable for sensing pressures in the chambers 54 and 62, respectively, and providing signals indicative of such pressures. The driver side pressure sensor 52 and the passenger side pressure sensor 60 may be mounted at any location in or on the doors 44 and 50, respectively, that is suitable for sensing pressures in the chambers 54 and 62. Alternatively, if the side structure of the vehicle 12 defines one or more other chambers in which the pressure may be affected by a vehicle crash, the driver and passenger side pressure sensors 52 and 60 may be mounted to sense the pressure in one or more of such other chambers.

The apparatus 10 may optionally include a satellite safing acceleration sensor 68, which is preferably an accelerometer, having its axis of sensitivity oriented to sense crash acceleration in a direction generally parallel to the Y axis. The satellite safing acceleration sensor 68 is preferably located in a plane that passes through the X axis of the vehicle 12 but is offset rearward of the collision sensor assembly 30. The satellite safing acceleration sensor 68 provides a crash acceleration signal designated SSS_1Y and preferably has a nominal sensitivity of ±250g's. The crash acceleration signal SSS_1Y can take any of several forms. The crash acceleration signal SSS_1Y can have amplitude, frequency, pulse duration, or any other electrical characteristic that varies as a function of the sensed crash acceleration. In the embodiment of FIGS. 1-4, the crash acceleration signal SSS_1Y has frequency and amplitude characteristics indicative of the sensed crash acceleration. Thus, the crash acceleration signal SSS_1Y is functionally related to the sensed crash acceleration along the Y axis of sensitivity.

Figure 4:
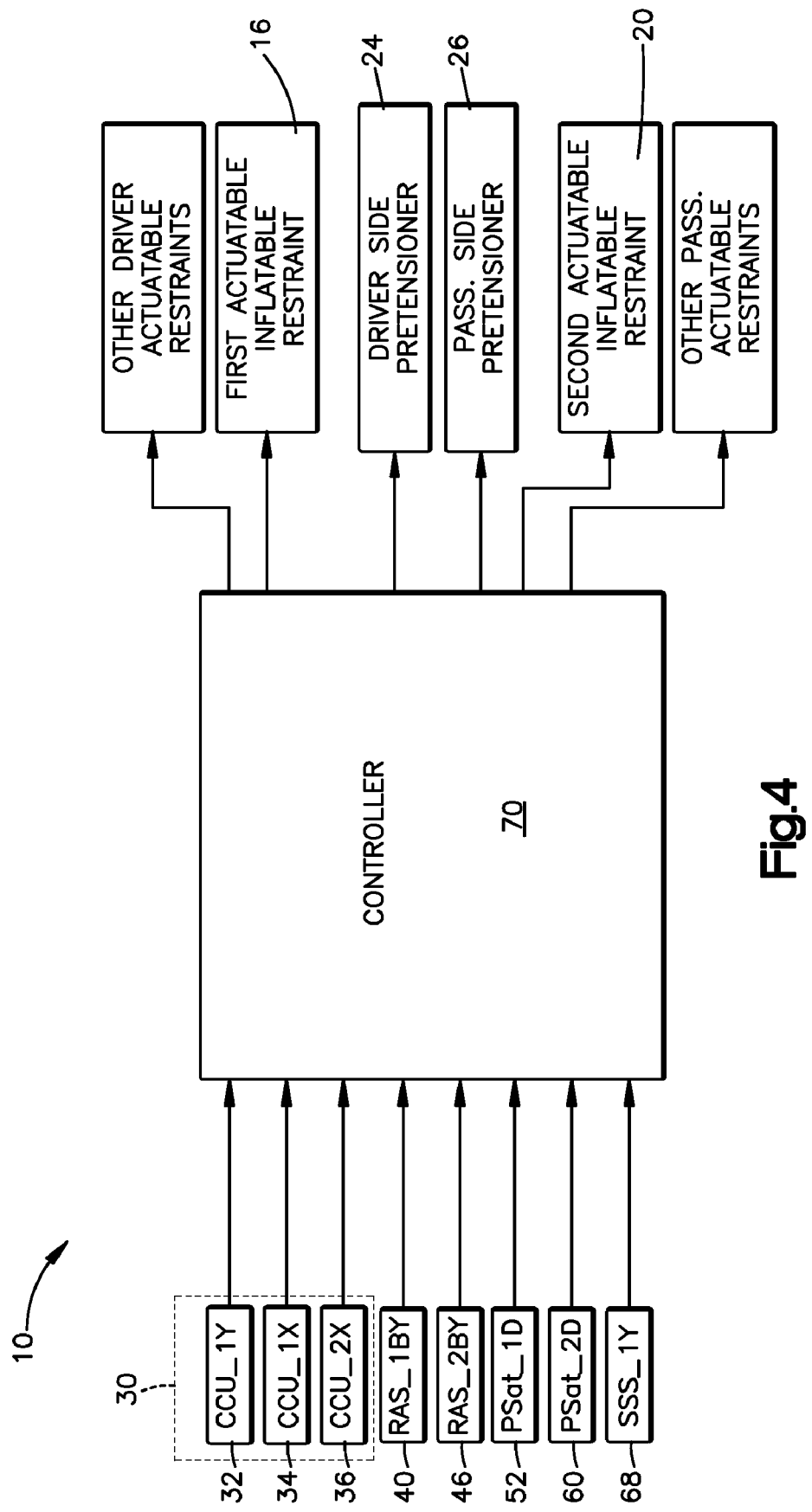
FIG. 4 is an electrical schematic block diagram of the apparatus of FIG. 1.

The crash acceleration signals CCU_1, RAS_1BY, and RAS_2BY from the crash acceleration sensors 32, 40 and 46, respectively, the crash acceleration signal SSS_1Y from the satellite safing acceleration sensor 68, and the side pressure signals PSat_1D and PSat_2D from the driver and passenger side pressure sensors 52 and 60, respectively are provided to a controller 70 (FIG. 4). The controller 70, which is included in the apparatus 10, is preferably a microcomputer programmed to execute a control process, including one or more algorithms, in accordance with the present invention. The functions performed by the controller 70 could, however, be carried out by other digital and/or analog circuitry, including separate electrical or electronic components, which could be assembled on one or more circuit boards or as an application specific integrated circuit ("ASIC").

The controller 70 monitors the crash acceleration signals CCU_1Y, RAS_1BY, and RAS_2BY from the crash acceleration sensors 32, 40 and 46, respectively, and the side pressure signals PSat_1D and PSat_2D from the driver and passenger side pressure sensors 52 and 60, respectively. The controller 70 executes one or more algorithms, as described in greater detail below, to determine whether a crash event is occurring for which actuation or deployment of the actuatable occupant restraint system 14 is desired and to discriminate between such a deployment crash event and a non-deployment crash event for which actuation or deployment of the actuatable occupant restraint system 14 is not desired. The algorithms determine values from the crash acceleration signals CCU_1Y, RAS_1BY, and RAS_2BY and the side pressure signals PSat_1D and PSat_2D. The determined values are used in deployment or actuation decisions. If a decision is made in accordance with the determined values to deploy or actuate the actuatable occupant restraint system 14 or a portion of the system, such as the first side impact inflatable occupant restraint device 16 or the second side impact inflatable occupant restraint device 20, the controller 70 outputs an appropriate deployment signal or command.

The apparatus 10 preferably uses only the crash acceleration signals CCU_1Y, RAS_1BY, and RAS_2BY and the side pressure signals PSat_1D and PSat_2D in deployment or actuation decisions. The apparatus 10 may alternatively also employ one or more of the crash acceleration signals SSS_1Y, CCU_1X, and CCU_2X, with or without filtering, in deployment or actuation decisions. Other signals that may be received and employed in deployment or actuation decisions, in addition to the crash acceleration signals CCU_1Y, RAS_1BY, and RAS_2BY and the side pressure signals PSat_1D and PSat_2D, are signals RAS_C3Y, RAS_C4Y, RAS_D5Y, and RAS_D6Y from optional C-pillar and/or D-pillar side satellite crash acceleration sensors. Still other signals that may be received and employed in deployment or actuation decisions may include signals from a driver and/or passenger seat belt buckle switch sensor that provides a signal indicating whether the buckle is latched or unlatched, a driver and/or passenger weight sensor that provides a signal indicative of the seat occupant's sensed weight, and sensors that provide signals indicative of other vehicle occupant information, such as presence, position, height, girth, movement and/or use of a child seat.

Figure 5:
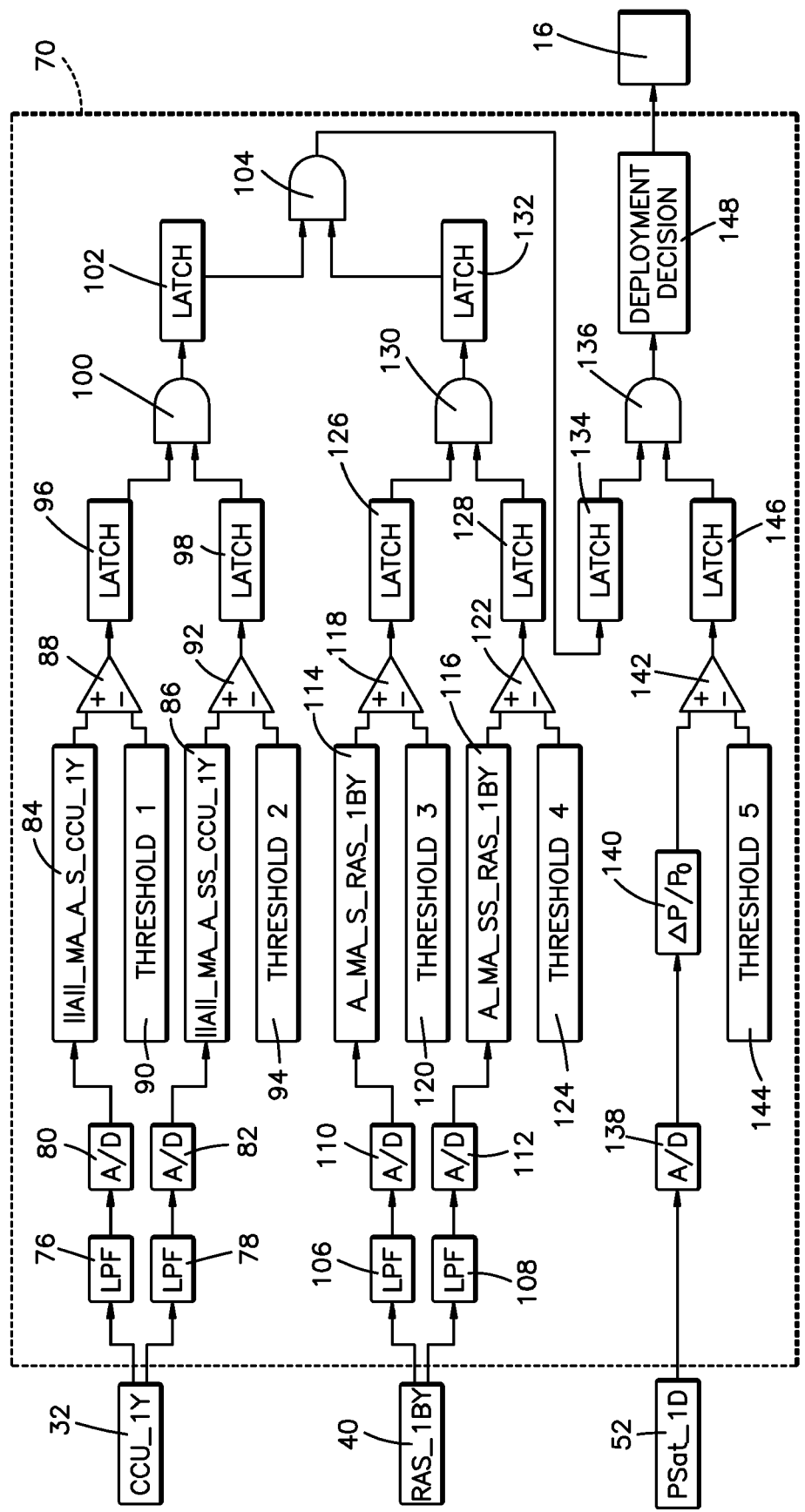
FIG. 5 is a logic diagram showing an example embodiment of the control logic used by an apparatus in accordance with the present invention.

The controller 70 controls the actuatable occupant restraint system 14 in accordance with a control process and logic. One embodiment of the control process and logic is shown in FIG. 5. The process and logic of FIG. 5 is specifically directed to controlling an actuatable occupant restraint device on the driver side 18 of the vehicle 12, such as the first side impact inflatable occupant restraint device 16. FIG. 5 is nonetheless representative of a process and logic that may be used to control the second side impact inflatable occupant restraint device 20 on the passenger side 22 of the vehicle 12 and any other actuatable occupant restraint device that helps to protect a vehicle occupant in response to a side impact to the vehicle 12.

In the control process of FIG. 5, the crash acceleration sensor 32 provides an acceleration signal CCU_1Y having a characteristic (e.g., frequency and amplitude) indicative of the vehicle's crash acceleration in a direction generally parallel to the Y axis of the vehicle 12 upon the occurrence of a crash event. The acceleration signal CCU_1Y is provided to two low-pass-filter ("LPF") functions 76 and 78 of the controller 70. The LPF functions 76 and 78 operate in parallel and filter the acceleration signal CCU_1Y to eliminate extraneous signal components, such as, frequencies resulting from extraneous vehicle operating events and/or from road noise. The signal components removed through filtering are not useful in discriminating a vehicle crash event for which deployment of a driver side actuatable occupant restraint device, such as the first side impact inflatable occupant restraint device 16, is desired. Empirical testing is used to determine the signal components useful for crash discrimination in a vehicle of interest. For reasons that will be explained below, the LPF functions 76 and 78 typically filter different signal components from the acceleration signal CCU_1Y. Signal components indicative of a crash event are passed for further processing.

The filtered output signal from the LPF function 76 is provided to an analog-to-digital ("A/D") converter function 80 of the controller 70. The A/D converter function 80 converts the filtered crash acceleration signal into a digital signal. The output of the A/D converter function 80 may be filtered with another filter function (not shown) having filter values empirically determined for the purpose of eliminating small drifts and offsets associated with the A/D conversion. This other filter function would be digitally implemented within the controller 70. A determination function 84 of the controller 70 determines a crash metric value ||A||_MA_A_S_CCU_1Y from the filtered crash acceleration signal CCU_1Y.

In parallel, the filtered output signal from the LPF function 78 is provided to an A/D converter function 82 of the controller 70. The A/D converter function 82 converts the filtered crash acceleration signal into a digital signal. The output of the A/D converter function 82 may be filtered with another filter function (not shown) having filter values empirically determined for the purpose of eliminating small drifts and offsets associated with the A/D conversion. This other filter function would be digitally implemented within the controller 70. A determination function 86 of the controller 70 determines a crash metric value ||A||_MA_A_SS_CCU_1Y from the filtered crash acceleration signal CCU_1Y.

The values ||A||_MA_A_S_CCU_1Y and ||A||_MA_A_SS_CCU_1Y are moving averages of the absolute values of acceleration as sensed by the first crash acceleration sensor 32. These values are determined by calculating moving averages of the absolute values of the associated filtered acceleration signal CCU_1Y from the first crash acceleration sensor 32. A moving average is the sum of the last predetermined number of samples of the filtered acceleration signal divided by the number of samples. The average is updated by removing the oldest sample, replacing it with the latest sample, and then determining the new average. As the average value changes or "moves" over time, it is referred to as a "moving average". The value ||A||MA_A_SS_CCU_1Y is determined using a smaller number of samples than the number of samples used to determine the value ||A||_MA_A_S_CCU_1Y. Empirical testing is used to determine the number of samples to be used for each of the values ‖A‖_MA_A_S_CCU_1Y and ‖A‖_MA_A_SS_CCU_1Y. The difference in the number of samples used to determine the values ‖A‖_MA_A_S_CCU_1Y and ‖A‖_MA_A_SS_CCU_1Y affects which signal components are filtered by the LPF functions 76 and 78.

The acceleration values ‖A‖_MA_A_S_CCU_1Y and ‖A‖_MA_A_SS_CCU_1Y are preferably determined using a virtual crash sensing process fully described in U.S. Pat. No. 6,186,539 to Foo et al. and U.S. Pat. No. 6,036,225 to Foo et al. using a spring mass model of the occupant to account for spring forces and damping forces. A detailed explanation of a spring-mass model is found in U.S. Pat. No. 5,935,182 to Foo et al.

Comparison functions of the controller 70 compare the values ‖A‖_MA_A_S_CCU_1Y and ‖A‖_MA_A_SS_CCU_1Y against respective thresholds, which are preferably fixed but may be variable. Specifically, a comparison function 88 compares the ‖A‖_MA_A_S_CCU_1Y value against a first threshold 90. A comparison function 92 compares the ‖A‖MA_A_SS_CCU_1Y value against a second threshold 94. Empirical testing is used to determine values of the first and second thresholds 90 and 94 for a vehicle of interest.

The occurrence of the ‖A‖_MA_A_S_CCU_1Y value exceeding the first threshold 90, as determined by comparison function 88, is latched by latch function 96 of controller 70, which provides a digital HIGH signal to an AND function 100 of the controller. The occurrence of the ‖A‖_MA_A_SS_CCU_1Y value exceeding the second threshold 94, as determined by comparison function 92, is latched by latch function 98 of controller 70, which provides a digital HIGH signal to the AND function 100. When the AND function 100 is ON or HIGH, as a result of receiving digital HIGH signals from both of the latch functions 96 and 98, this occurrence is latched by a latch function 102 of the controller 70, which provides a digital HIGH signal to an AND function 104 of the controller.

The driver side satellite crash acceleration sensor 40 provides an acceleration signal RAS_1BY having a characteristic (e.g., frequency and amplitude) indicative of the vehicle's crash acceleration in a direction generally parallel to the Y axis of the vehicle 12 upon the occurrence of a crash event. The acceleration signal RAS_1BY is provided to two LPF functions 106 and 108 of the controller 70. The LPF functions 106 and 108 operate in parallel and filter the acceleration signal RAS_1BY to eliminate extraneous signal components, such as, frequencies resulting from extraneous vehicle operating events and/or from road noise. The signal components removed through filtering are not useful in discriminating a vehicle crash event for which deployment of a driver side actuatable occupant restraint device, such as the first side impact inflatable occupant restraint device 16, is desired. Empirical testing is used to determine the signal components useful for crash discrimination in a vehicle of interest. For reasons that will be explained below, the LPF functions 106 and 108 typically filter different signal components from the acceleration signal RAS_1BY. Signal components indicative of a crash event are passed for further processing.

The filtered output signal from the LPF function 106 is provided to an A/D converter function 110 of the controller 70. The A/D converter function 110 converts the filtered crash acceleration signal RAS_1BY into a digital signal. The output of the A/D converter function 110 may be filtered with another filter function (not shown) having filter values empirically determined for the purpose of eliminating small drifts and offsets associated with the A/D conversion. This other filter function would be digitally implemented within the controller 70. A determination function 114 of the controller 70 determines a crash metric value A_MA_A_S_RAS_1BY from the filtered crash acceleration signal RAS_1BY.

In parallel, the filtered output signal from the LPF function 108 is provided to an A/D converter function 112 of the controller 70. The A/D converter function 112 converts the filtered crash acceleration signal into a digital signal. The output of the A/D converter function 112 may be filtered with another filter function (not shown) having filter values empirically determined for the purpose of eliminating small drifts and offsets associated with the A/D conversion. This other filter function would be digitally implemented within the microcomputer. A determination function 116 of the controller 70 determines a crash metric value A_MA_A_SS_RAS_1BY from the filtered crash acceleration signal RAS_1BY.

The values A_MA_A_S_RAS_1BY and A_MA_A_SS_RAS_1BY are moving averages of acceleration as sensed by the driver side satellite crash acceleration sensor 40. These values are determined by calculating moving average values of the associated filtered acceleration signal RAS_1BY from the driver side satellite crash acceleration sensor 40. A moving average is the sum of the last predetermined number of samples of the filtered acceleration signal divided by the number of samples. The average is updated by removing the oldest sample, replacing it with the latest sample, and then determining the new average. As the average value changes or "moves" over time, it is referred to as a "moving average". The value A_MA_A_SS_RAS_1BY is determined using a smaller number of samples than the number of samples used to determine the value A_MA_A_S_RAS_1BY. Empirical testing is used to determine the number of samples to be used for each of the values A_MA_A_S_RAS_1BY and A_MA_A_SS_RAS_1BY. The difference in the number of samples used to determine the values A_MA_A_S_RAS_1BY and A_MA_A_SS_RAS_1B affects which signal components are filtered by the LPF functions 106 and 108.

Comparison functions of the controller 70 compare the values A_MA_A_S_RAS_1BY and A_MA_A_SS_RAS_1BY against respective thresholds, which are preferably fixed but may be variable. Specifically, a comparison function 118 compares the A_MA_A_S_RAS_1BY value against a third threshold 120. A comparison function 122 compares the A_MA_A_SS_RAS_1BY value against a fourth threshold 124. Empirical testing is used to determine values of the third and fourth thresholds 120 and 124 for a vehicle of interest.

The occurrence of the A_MA_A_S_RAS_1BY value exceeding the third threshold 120, as determined by comparison function 118, is latched by latch function 126 of controller 70, which provides a digital HIGH signal to an AND function 130 of the controller. The occurrence of the A_MA_A_SS_RAS_1BY value exceeding the fourth threshold 124, as determined by comparison function 122, is latched by a latch function 128 of controller 70, which provides a digital HIGH signal to the AND function 130. When the AND function 130 is ON or HIGH, as a result of receiving digital HIGH signals from both of the latch functions 126 and 128, this occurrence is latched by a latch function 132 of the controller 70, which provides a digital HIGH signal to the AND function 104 of the controller. When the AND function 104 is ON or HIGH, as a result of receiving digital HIGH signals from both of the latch functions 102 and 132, this occurrence is latched by a latch function 134 of the controller 70, which provides a digital HIGH signal to an AND function 136 of the controller.

The driver side pressure sensor 52 provides the pressure signal PSat_1D, which is indicative of the pressure in the chamber 54 in the driver side door 44 upon the occurrence of a crash event. The pressure signal PSat_1D is provided to an A/D converter function 138 of the controller 70. The A/D converter function 138 converts the pressure signal PSat_1D into a digital signal. The output of the A/D converter function 138 is provided to a determination function 140 of the controller 70, which determines a crash metric value $\Delta P/P_0$, where $\Delta P$ is the change in pressure as determined by two pressure values measured at different times and $P_0$ is ambient pressure outside the vehicle 12.

A comparison function 142 of the controller 70 compares the value $\Delta P/P_0$ against a fifth threshold 144, which is preferably fixed but may be variable. The occurrence of the $\Delta P/P_0$ value exceeding the fifth threshold 144, as determined by comparison function 142, is latched by a latch function 146 of controller 70, which provides a digital HIGH signal to the AND function 136 of the controller. When the AND function 136 receives digital HIGH signals from both the latch function 146 and the latch function 134, the AND function 136 is ON or HIGH. In response to the AND function 136 being ON or HIGH, a deployment control function 148 of the controller 70 outputs a deployment signal to a driver side actuatable occupant restraint device, such as the first side impact inflatable occupant restraint device 16, which deploys in response to the deployment signal.

Figure 6:
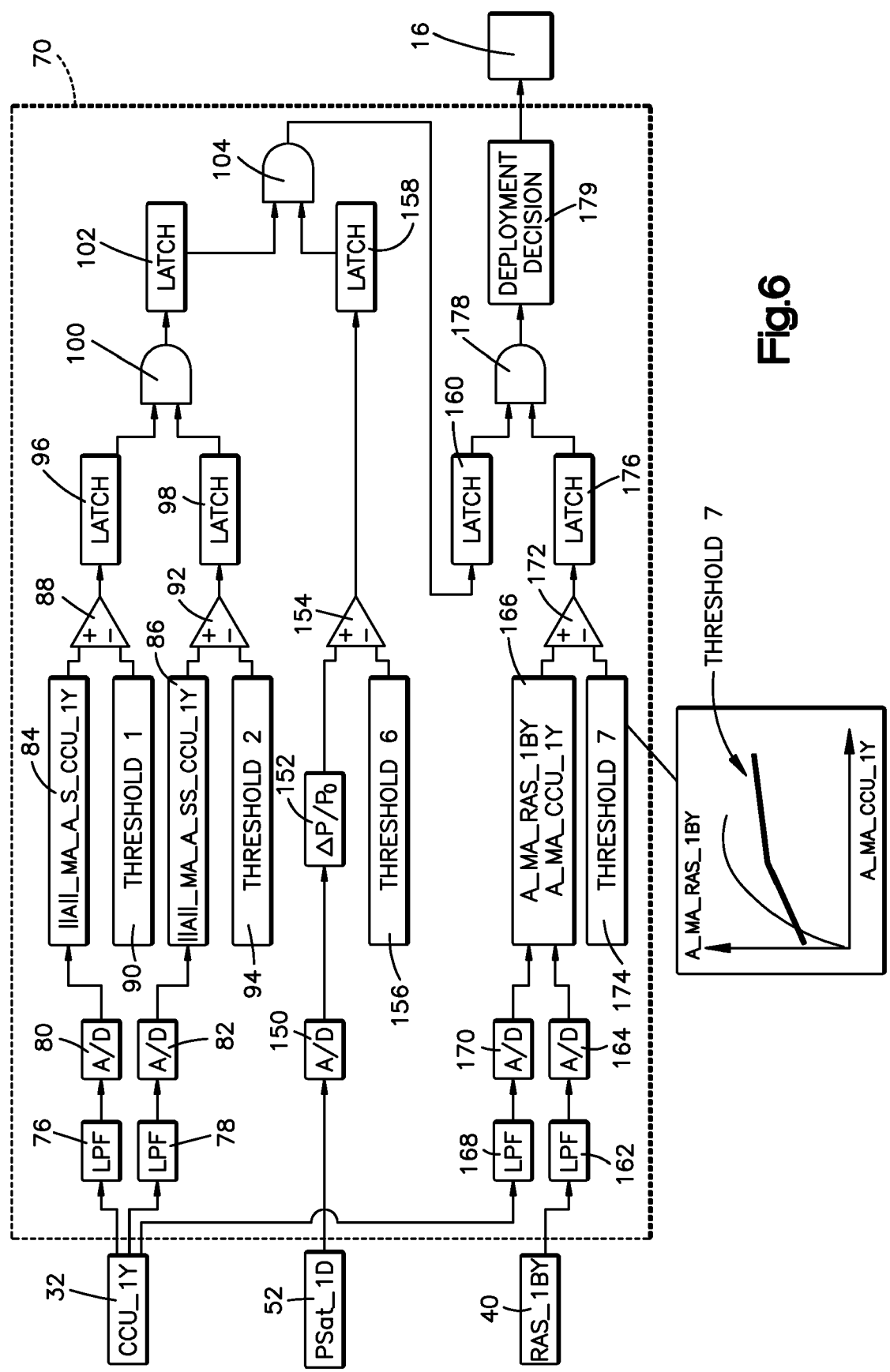
FIG. 6 is a logic diagram showing a second example embodiment of the control logic used by an apparatus in accordance with the present invention.

A second embodiment of the control process and logic used by the controller 70 to control the actuatable occupant restraint system 14 is shown in FIG. 6. The process and logic of FIG. 6 is specifically directed to controlling an actuatable occupant restraint device on the driver side 18 of the vehicle 12, such as the first side impact inflatable occupant restraint device 16. FIG. 6 is nonetheless representative of a process and logic that may be used to control the second side impact inflatable occupant restraint device 20 on the passenger side 22 of the vehicle 12 and any other actuatable occupant restraint device that helps to protect a vehicle occupant in response to a side impact to the vehicle 12.

In the control process of FIG. 6, the first crash acceleration sensor 32 provides an acceleration signal CCU_1Y to the controller 70, and the controller processes the signal CCU_1Y in the same manner and with the same functions as in the control process of FIG. 5 through and including the AND function 104 of the controller. The control process of FIG. 6 differs, however, from the control process of FIG. 5 with respect to the processing of the acceleration signal RAS_1BY from the driver side satellite crash acceleration sensor 40 and the pressure signal PSat_1D from the driver side pressure sensor 52, as explained below.

The driver side pressure sensor 52 provides the pressure signal PSat_1D, which is indicative of the pressure in the chamber 54 in the driver side door 44 upon the occurrence of a crash event, to an A/D converter function 150 of the controller 70. The A/D converter function 150 converts the pressure signal PSat_1D into a digital signal. The output of the A/D converter function 150 is provided to a determination function 152 of the controller 70, which determines a crash metric value $\Delta P/P_0$, where $\Delta P$ is the change in pressure as determined by two pressure values measured at different times and $P_0$ is ambient pressure outside the vehicle 12.

A comparison function 154 of the controller 70 compares the value $\Delta P/P_0$ against a sixth threshold 156, which is preferably fixed but may be variable. The occurrence of the $\Delta P/P_0$ value exceeding the sixth threshold 156, as determined by comparison function 154, is latched by a latch function 158 of controller 70, which provides a digital HIGH signal to the AND function 104 of the controller. When the AND function 104 is ON or HIGH, as a result of receiving digital HIGH signals from both of the latch functions 102 and 158, this occurrence is latched by a latch function 160 of the controller 70, which provides a digital HIGH signal to AND function 178 of the controller.

The driver side satellite crash acceleration sensor 40 provides the acceleration signal RAS_1BY, which is indicative of the vehicle's crash acceleration in a direction generally parallel to the Y axis of the vehicle 12 upon the occurrence of a crash event, to an LPF function 162 of the controller 70. The LPF function 162 filters the acceleration signal RAS_1BY to eliminate extraneous signal components, such as, frequencies resulting from extraneous vehicle operating events and/or from road noise. The signal components removed through filtering are not useful in discriminating a vehicle crash event for which deployment of a driver side actuatable occupant restraint device, such as the first side impact inflatable occupant restraint device 16, is desired. Empirical testing is used to determine the signal components useful for crash discrimination in a vehicle of interest. Signal components indicative of a crash event are passed for further processing.

The filtered output signal from the LPF function 162 is provided to an A/D converter function 164 of the controller 70. The A/D converter function 164 converts the filtered crash acceleration signal RAS_1BY into a digital signal. The output of the A/D converter function 164 may be filtered with another filter function (not shown) having filter values empirically determined for the purpose of eliminating small drifts and offsets associated with the A/D conversion. This other filter function would be digitally implemented within the controller 70. A determination function 166 of the controller 70 determines a crash metric value A_MA_RAS_1BY from the filtered crash acceleration signal RAS_1BY.

In parallel, the crash acceleration signal CCU_1Y from the first crash acceleration sensor 32 is provided to an LPF function 168 of the controller 70. The LPF function 168 filters the acceleration signal CCU_1Y to eliminate extraneous signal components, such as, frequencies resulting from extraneous vehicle operating events and/or from road noise. The signal components removed through filtering are not useful in discriminating a vehicle crash event for which deployment of a driver side actuatable occupant restraint device, such as the first side impact inflatable occupant restraint device 16, is desired. Empirical testing is used to determine the signal components useful for crash discrimination in a vehicle of interest. Signal components indicative of a crash event are passed for further processing.

The filtered output signal from the LPF function 168 is provided to an A/D converter function 170 of the controller 70. The A/D converter function 170 converts the filtered crash acceleration signal into a digital signal. The output of the A/D converter function 170 may be filtered with another filter function (not shown) having filter values empirically determined for the purpose of eliminating small drifts and offsets associated with the A/D conversion. This other filter function would be digitally implemented within the microcomputer. The digital filtered output signal from the A/D converter function 170 is provided to the determination function 166 of the controller 70, which determines a crash metric value A_MA_CCU_1Y from the filtered crash acceleration signal CCU_1Y.

The values A_MA_CCU_1Y and A_MA_RAS_1BY are moving averages of acceleration as sensed by the first crash acceleration sensor 32 and the driver side satellite crash acceleration sensor 40, respectively. These values are determined by calculating moving average values of the associated filtered acceleration signals CCU_1Y and RAS_1BY from the first crash acceleration sensor 32 and the driver side satellite crash acceleration sensor 40. A moving average, as previously explained, is the sum of the last predetermined number of samples of the filtered acceleration signal divided by the number of samples. The average is updated by removing the oldest sample, replacing it with the latest sample, and then determining the new average. As the average value changes or "moves" over time, it is referred to as a "moving average". Empirical testing is used to determine the number of samples to be used for each of the values A_MA_CCU_1Y and A_MA_RAS_1BY.

A comparison function 172 of the controller 70 compares the value A_MA_RAS_1BY against a threshold, which is preferably variable but may be fixed. Specifically, the comparison function 172 compares the A_MA_RAS_1BY value as a function of the A_MA_CCU_1Y value against a seventh varying threshold 174. A graphical representation of the variation of the seventh threshold 174 is included in FIG. 6. As can be seen, with increasing values of A_MA_RAS_1BY, the seventh threshold 174 generally increases as the A_MA_CCU_1Y value increases. Empirical testing is used to determine the variation in the seventh threshold 174 as a function of the moving average value A_MA_CCU_1Y. The occurrence of the A_MA_RAS_1BY value exceeding the seventh threshold 174, as determined by comparison function 172, is latched by a latch function 176 of the controller 70, which provides a digital HIGH signal to the AND function 178 of the controller.

When the AND function 178 receives digital HIGH signals from both the latch function 176 and the latch function 158, the AND function 178 is ON or HIGH. In response to the AND function 178 being ON or HIGH, a deployment control function 179 of the controller 70 outputs a deployment signal to a driver side actuatable occupant restraint device, such as the first side impact inflatable occupant restraint device 16, which deploys in response to the deployment signal.

A third embodiment of the control process and logic used by the controller 70 to control the actuatable occupant restraint system 14 is shown in FIG. 7. The process and logic of FIG. 7 is specifically directed to controlling an actuatable occupant restraint device on the driver side 18 of the vehicle 12, such as the first side impact inflatable occupant restraint device 16. FIG. 7 is nonetheless representative of a process and logic that may be used to control the second side impact inflatable occupant restraint device 20 on the passenger side 22 of the vehicle 12 and any other actuatable occupant restraint device that helps to protect a vehicle occupant in response to a side impact to the vehicle 12.

In the control process of FIG. 7, the first crash acceleration sensor 32 provides the acceleration signal CCU_1Y to the controller 70, the driver side satellite crash acceleration sensor 40 provides the acceleration signal RAS_1BY to the controller, and the driver side pressure sensor 52 provides the pressure signal PSat_1D to the controller, as is done in the control process of FIG. 5. The controller 70 processes the signals CCU_1Y, RAS_1BY, and PSat_1D in substantially the same manner and with substantially the same functions as in the control process of FIG. 5. The control process of FIG. 7 differs, however, from the control process of FIG. 5 in that the control process of FIG. 7 also monitors and processes the crash acceleration signal SSS_1Y from the satellite safing acceleration sensor 68. This processing of the crash acceleration signal SSS_1Y, which occurs in parallel with the processing of the crash acceleration signal CCU_1Y, is explained below.

In the control process of FIG. 7, the satellite safing acceleration sensor 68 provides the acceleration signal SSS_1Y, which is indicative of the vehicle's crash acceleration in a direction generally parallel to the Y axis of the vehicle 12 upon the occurrence of a crash event, to two LPF functions 180 and 182 of the controller 70. The LPF functions 180 and 182 operate in parallel and filter the acceleration signal SSS_1Y to eliminate extraneous signal components, such as, frequencies resulting from extraneous vehicle operating events and/or from road noise. The signal components removed through filtering are not useful in discriminating a vehicle crash event for which deployment of a driver side actuatable occupant restraint device, such as the first side impact inflatable occupant restraint device 16, is desired. Empirical testing is used to determine the signal components useful for crash discrimination in a vehicle of interest. For reasons that will be explained below, the LPF functions 180 and 182 typically filter different signal components from the acceleration signal SSS_1Y. Signal components indicative of a crash event are passed for further processing.

The filtered output signal from the LPF function 180 is provided to an A/D converter function 184 of the controller 70. The A/D converter function 184 converts the filtered crash acceleration signal into a digital signal. The output of the A/D converter function 184 may be filtered with another filter function (not shown) having filter values empirically determined for the purpose of eliminating small drifts and offsets associated with the A/D conversion. This other filter function would be digitally implemented within the controller 70. A determination function 188 of the controller 70 determines a crash metric value $\|A\|\_MA\_A\_S\_SSS\_1Y$ from the filtered crash acceleration signal SSS_1Y.

In parallel, the filtered output signal from the LPF function 182 is provided to an A/D converter function 186 of the controller 70. The A/D converter function 186 converts the filtered crash acceleration signal into a digital signal. The output of the A/D converter function 186 may be filtered with another filter function (not shown) having filter values empirically determined for the purpose of eliminating small drifts and offsets associated with the A/D conversion. This other filter function would be digitally implemented within the controller 70. A determination function 190 of the controller 70 determines a crash metric value $\|A\|\_MA\_A\_SS\_SSS\_1Y$ from the filtered crash acceleration signal SSS_1Y.

The values $\|A\|\_MA\_A\_S\_SSS\_1Y$ and $\|A\|\_MA\_A\_SS\_SSS\_1Y$ are moving averages of the absolute values of acceleration as sensed by the satellite safing acceleration sensor 68. These values are determined by calculating moving averages of the absolute values of the associated filtered acceleration signal SSS_1Y from the satellite safing acceleration sensor 68. A moving average, as previously explained, is the sum of the last predetermined number of samples of the filtered acceleration signal divided by the number of samples. The average is updated by removing the oldest sample, replacing it with the latest sample, and then determining the new average. As the average value changes or "moves" over time, it is referred to as a "moving average". The value $\|A\|\_MA\_A\_SS\_SSS\_1Y$ is determined using a smaller number of samples than the number of samples used to determine the value $\|A\|\_MA\_A\_S\_SSS\_1Y$. Empirical testing is used to determine the number of samples to be used for each of the values $\|A\|\_MA\_A\_S\_SSS\_1Y$ and $\|A\|\_MA\_A\_SS\_SSS\_1Y$. The difference in the number of samples used to determine the values ‖A‖_MA_A_S_SSS_1Y and ‖A‖_MA_A_SS_SSS_1Y affects which signal components are filtered by the LPF functions 180 and 182.

Comparison functions of the controller 70 compare the values ‖A‖_MA_A_S_SSS_1Y and ‖A‖_MA_A_SS_SSS_1Y against respective thresholds, which are preferably fixed but may be variable. Specifically, a comparison function 192 compares the ‖A‖_MA_A_S_SSS_1Y value against an eighth threshold 194. A comparison function 196 compares the ‖A‖_MA_A_SS_SSS_1Y value against a ninth threshold 198. Empirical testing is used to determine values of the eighth and ninth thresholds 194 and 198 for a vehicle of interest.

The occurrence of the ‖A‖_MA_A_S_SSS_1Y value exceeding the eighth threshold 194, as determined by comparison function 192, is latched by latch function 200 of controller 70, which provides a digital HIGH signal to an AND function 204 of the controller. The occurrence of the ‖A‖_MA_A_SS_SSS_1Y value exceeding the ninth threshold 198, as determined by comparison function 196, is latched by a latch function 202 of controller 70, which provides a digital HIGH signal to the AND function 204. When the AND function 204 is ON or HIGH, as a result of receiving digital HIGH signals from both of the latch functions 200 and 202, the AND function 204 provides a digital HIGH signal to an AND function 206. The AND function 206 receives the output of both the AND function 204 and the AND function 100. Unlike the control process shown in FIG. 5, the AND function 100 does not provide its output to the latch function 102. Instead, the AND function 100 provides its output to the AND function 206. When the AND function 206 is ON or HIGH, as a result of receiving digital HIGH signals from both of the AND functions 204 and 100, the AND function 206 provides a digital HIGH signal to the latch function 102 of the controller 70, which provides a digital HIGH signal to the AND function 104 of the controller. Thereafter, the control process of FIG. 7 proceeds in the same manner and with the same functions as the control process of FIG. 5.

The foregoing subroutine using the signal SSS_1Y from the satellite safing acceleration sensor 68 can also be employed in the same manner in the control process of FIG. 6.

From the above description of the invention, those skilled in the art will perceive improvements, changes and modifications. Such improvements, changes, and/or modifications within the skill of the art are intended to be covered by the appended claims.

Having described the invention, the following is claimed:

1. An apparatus for controlling an actuatable occupant restraint device of a vehicle, said apparatus comprising:
a central crash acceleration sensor for sensing crash acceleration in a direction generally perpendicular to a longitudinal axis of the vehicle at a central vehicle location and providing a first crash acceleration signal indicative thereof;
a side pressure sensor for sensing pressure in a chamber disposed at a side of the vehicle and providing a side pressure signal indicative thereof; and
a controller for actuating the actuatable occupant restraint device in response to the first crash acceleration signal and the side pressure signal,
said controller (a) determining a first acceleration value from a moving average of absolute values of the first crash acceleration signal, (b) determining a change in pressure value comprising a change in pressure in said chamber determined from the side pressure signal, and (c) actuating said actuatable occupant restraint device when both said determined first acceleration value exceeds a first threshold and said determined change in pressure value exceeds a second threshold.

2. The apparatus of claim 1 wherein said change in pressure value comprises change in pressure in said chamber divided by ambient pressure.

3. The apparatus of claim 1 wherein said actuatable occupant restraint device is an inflatable restraint device mounted at the side of the vehicle.

4. The apparatus of claim 1 wherein said chamber is a chamber in a vehicle door.

5. The apparatus of claim 1 wherein said apparatus further comprises a side satellite acceleration sensor mounted in a side structure of the vehicle for sensing crash acceleration in a direction generally perpendicular to the longitudinal axis of the vehicle and providing a second crash acceleration signal indicative thereof, said controller determining a second acceleration value comprising a moving average of the second crash acceleration signal and actuating said actuatable occupant restraint device when said determined first acceleration value exceeds a first threshold, said determined change in pressure value exceeds a second threshold, and said determined second acceleration value exceeds a third threshold.

6. The apparatus of claim 5 further comprising a satellite safing acceleration sensor mounted on the vehicle for sensing crash acceleration in a direction generally perpendicular to the longitudinal axis of the vehicle and providing a third crash acceleration signal indicative thereof, said controller determining a third acceleration value from a moving average of the third crash acceleration signal and actuating said actuatable occupant restraint device when said determined first acceleration value exceeds a first threshold, said determined change in pressure value exceeds a second threshold, said determined second acceleration value exceeds a third threshold, and said third acceleration value exceeds a fourth threshold.

7. A method for controlling actuation of an actuatable occupant restraint device of a vehicle, the method comprising the steps of:
sensing crash acceleration at a central vehicle location in a direction generally perpendicular to a longitudinal axis of the vehicle and providing a first crash acceleration signal indicative thereof;
sensing pressure in a chamber disposed at a vehicle side and providing a side pressure signal indicative thereof;
determining a first acceleration value from a moving average of absolute values of the first crash acceleration signal;
determining a change in pressure value comprising a change in pressure in said chamber determined from the side pressure signal; and
actuating said actuatable occupant restraint device when both said determined first acceleration value exceeds a first threshold and said determined change in pressure value exceeds a second threshold.

8. The method of claim 7 wherein the step of determining a change in pressure value comprises determining said change in pressure in said chamber divided by ambient pressure.

9. The method of claim 7 wherein said actuatable occupant restraint device is an inflatable restraint mounted at the side of the vehicle.

10. The method of claim 7 wherein said chamber is a chamber in a vehicle door.

11. The method of claim 7 wherein said method further comprises the steps of sensing crash acceleration in a direction generally perpendicular to the longitudinal axis of the vehicle at a vehicle side location, providing a second crash acceleration signal indicative thereof, and determining a second acceleration value comprising a moving average of said second crash acceleration signal, and wherein said step of actuating the actuatable occupant restraint device comprises actuating said actuatable occupant restraint device when said determined first acceleration value exceeds a first threshold, said determined change in pressure value exceeds a second threshold, and said determined second acceleration value exceeds a third threshold.

12. The method of claim 11 further comprising the steps of sensing crash acceleration in a direction generally perpendicular to the longitudinal axis of the vehicle at a satellite safing location of the vehicle, providing a third crash acceleration signal indicative thereof, and determining a third acceleration value from a moving average of said third crash acceleration signal, and wherein said step of actuating the actuatable occupant restraint device comprises actuating said actuatable occupant restraint device when said determined first acceleration value exceeds a first threshold, said determined change in pressure value exceeds a second threshold, said determined second acceleration value exceeds a third threshold, and said third acceleration value exceeds a fourth threshold.

* * * * *